Sept. 21, 1954   J. B. McKINLEY   2,689,825
REMOVAL OF METALS FROM PETROLEUM HYDROCARBONS
FOLLOWED BY FLUIDIZED CRACKING
Filed Feb. 6, 1951
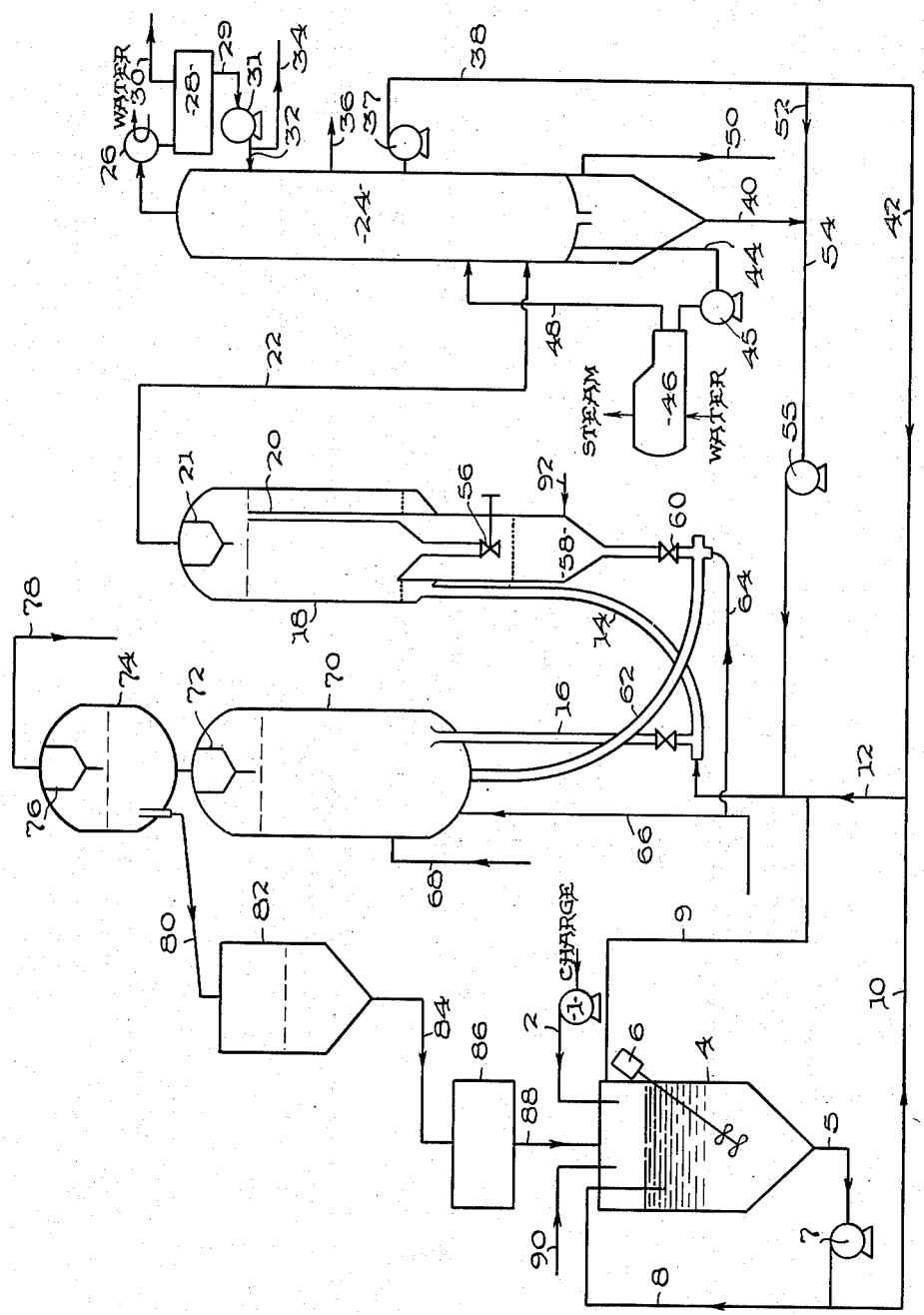
INVENTOR.
JOSEPH B. McKINLEY
BY
*A. M. Houghton*
*his* ATTORNEY Patented Sept. 21, 1954

2,689,825

UNITED STATES PATENT OFFICE 2,689,825

REMOVAL OF METALS FROM PETROLEUM HYDROCARBONS FOLLOWED BY FLUIDIZED CRACKING

Joseph B. McKinley, Pittsburgh, Pa., assignor to Gulf Research & Development Company, Pittsburgh, Pa., a corporation of Delaware Application February 6, 1951, Serial No. 209,664

5 Claims. (Cl. 196—52)

This invention relates to an improved process for removing inorganic contaminants from the charge stock to a fluid catalytic unit, whereby desired equilibrium activity of the catalyst is maintained with a minimum addition of make-up catalyst.

It is known that crude oils often contain substantial proportions of inorganic constituents. These materials are undesirable, since they may have a harmful effect on refining equipment and catalysts or other materials with which the hydrocarbon oils come into contact. Furthermore, these inorganic constituents may be undesirable in the final refined products.

Conventional desalting operations effect the removal of a substantial proportion of these inorganic constituents and in particular the water-soluble salts contained in the crude. While the crudes which have been desalted by conventional operations may contain substantially no inorganic constituents as determined by conventional tests for salts as chlorides, they may contain amounts of certain metals as determined by the ash method. Examples of metals which may be present as ash-forming constituents are nickel, vanadium, iron and copper. While these substances are ordinarily present in minute amounts, the quantity is often sufficient to interfere with proper refining, since it is known that extremely small amounts of these metals can substantially reduce the activity of, for example, cracking catalysts.

The metallic contaminants may be present in the form of certain salts and/or oxides with possibly some pure metal present in suspension. These substances may have been present in the original crude or may have been picked up as contaminants from metal equipment, such as pipelines. It is usually presumed that at least a portion of these metallic substances are derived from the latter source, since they are found in distillates as well as in crudes and residual oils.

The presence of metallic contaminants, such as those described above, which deposit upon and deactivate cracking catalysts, is particularly undesirable in charge stocks which are to be treated in a fluid catalytic cracking unit. This is true, since the addition of large amounts of make-up catalyst over and above the amounts of catalyst necessary to replace lost fines may be necessary in order to maintain equilibrium activity. Large additions of make-up catalyst in the operation tend to increase the cost of the refining treatment. Further, these metals tend to increase the carbon laydown on the catalyst, necessitating greater regeneration requirements.

A principal object of the invention is to provide a process which will allow an operator to maintain the desired catalyst activity level in a fluid catalytic cracking system with minimum addition of make-up catalyst. It is a further object of the invention to effect more complete removal of metallic contaminants from a charge to a fluid unit. It is also an object of the invention to perform the above functions at minimum expense with regard to extraneous equipment, treating materials, and the like. It is an additional object of the invention to provide a source of demetalizing materials which is integral with fluid catalytic systems. Another object is to provide suitable apparatus for performing these objects.

These and other objects are accomplished by my invention which comprises a process for removing an inorganic contaminant from a hydrocarbon oil charged to a fluid catalytic cracking unit. The process comprises pretreating hydrocarbon oil which contains an inorganic contaminant by contacting it with cracking catalyst fines at an elevated temperature and adsorbing inorganic contaminant in the charge on these fines, before the charge is further contacted with active catalyst. Oil-catalyst fines mixture is withdrawn from the pretreating zone and is contacted with a main body of fluidized cracking catalyst particles of larger size in a reaction zone at a temperature sufficient to catalytically crack the hydrocarbon oil into lower boiling hydrocarbons. Cracked product, catalyst and contaminated fines are withdrawn from the reaction zone. Catalyst and contaminated fines are then transferred to a regenerating zone and regenerated. Catalyst particles of relatively small size are separated from the main body of regenerated catalyst. This portion of separated catalyst is further divided according to size into two portions. The finer portion, derived predominantly from the pretreating step, is discarded; the remaining separated catalyst particles or as much of them as needed are pulverized to approximately the size of the discarded fines and returned to the slurrying step. The amount of fines returned to the pretreating step may be augmented by grinding that portion of the main body of catalyst which is normally replaced by fresh catalyst in order to maintain equilibrium activity. By operating in this fashion most of the catalyst eliminated from the system is eliminated as contaminated fines. The invention also includes suitable apparatus for carrying out the process.

In the following description, certain preferred modifications of the invention have been described. It is understood that these are by way of illustration and are not to be considered as limiting.

Referring briefly to the attached drawing, Figure 1 illustrates one suitable apparatus for carrying out my invention in connection with a fluid catalytic cracking process.

In the operation of my process catalyst fines obtained from the system, as will hereinafter be described, are premixed in the desired proportion with charge stock at an elevated temperature. It is essential for the purposes of this invention that at least a major portion of the inorganic contaminants contained in the charge stock, and capable of being removed by the particularly chosen amount of catalyst fines, be removed by adsorption on the catalyst fines in the pretreating or soaking zone prior to further contact of the charge stock with active cracking catalyst. This will be obvious, since otherwise, the active catalyst particles will compete in the reactor with catalyst fines for adsorption of the metallic contaminants.

I have found in my work on adsorption of ash-forming metallic constituents from hydrocarbon oils, that the use of elevated temperature in the pretreating stage is very important. In general, the degree of adsorption of these metallic substances increases with increasing temperature. This fact is illustrated by the following data which were obtained using a constant oil to activated clay ratio:

TABLE I

Removal of metals from heavy oil by adsorption on activated clay

| Product | Treating Conditions to Obtain Product | | Percent Nickel, Vanadium, Iron and Copper in Product |
|---|---|---|---|
| | Temperature (° F.) | Contact Time of Oil with Clay (Minutes) | |
| Charge | | | 0.00317 |
| Run 1 | 300 | 20 | 0.00223 |
| Run 2 | 390 | 20 | 0.00201 |
| Run 3 | 500 | 20 | 0.00162 |
| Run 4 | 680 | 20 | 0.00175 |

This study indicates that the efficiency of adsorption of metals improves as temperature is increased up to about 500° F., and that the efficiency is substantially constant at 500° to 680° F.

In view of the above noted effects, it is obvious that relatively high temperatures in the slurrying stage are to be desired for most effective removal of the metallic contaminants. It should be pointed out that although temperatures encountered in the reaction zone will exceed those employed in the pretreating or slurrying zone, preferential removal of the metallic contaminants by the catalyst fines is enabled by employing an elevated temperature in the preliminary stage of the process.

It is also desirable that the charge stock remain in contact with the catalyst fines at elevated temperature for an appreciable period of time (longer than the period of time involved in merely mixing and transporting the catalyst fines-oil mixture to the reactor) in order that more complete removal of the contaminants may occur. Failure to observe this expedient results in a reduction in the efficiency of the process, since relatively more adsorption of the ash-forming constituents will take place on the active catalyst particles in the reactor. As stated above, most of the contaminants in the charge capable of being removed by the given amount of fines should be adsorbed on the catalyst fines, before the charge is treated with the main body of active cracking catalyst.

Table II presents data showing the effect of contact time when treating a heavy oil with activated clay using a constant oil to clay ratio. This table shows that increased demetalization occurs with increased contact times, but that the rate of demetalization decreases during successive increased contact time intervals. In general, it has been found that the rate of demetalization is too slow after 60 minutes contact time to justify the use of longer contact times.

TABLE II

Removal of metals from heavy oil by adsorption on activated clay

| Product | Treating Conditions to Obtain Product | | Percent Nickel, Vanadium, Iron and Copper in Product |
|---|---|---|---|
| | Temperature (° F.) | Contact Time of Oil with Clay (Minutes) | |
| Charge | | | 0.00192 |
| Run 1 | 500 | 20 | 0.00086 |
| Run 2 | 500 | 30 | 0.00070 |

After the pretreatment is carried out for a suitable length of time, slurry is removed from the soaking zone and contacted with active fluidized cracking catalyst under cracking conditions. Converted products, catalyst and contaminated fines are withdrawn continuously from the reaction zone. The catalyst, containing contaminated fines, which is withdrawn is continually removed to a regenerating zone, as is usual in fluid catalytic units, where regenerating, i. e., oxidizing, conditions are maintained.

A portion of the catalyst of a relatively small size (and including the contaminated fines) is separated from the main body of regenerated catalyst. This separated portion is in turn divided into two portions according to size. The finer particles, which are those catalyst fines originally mixed with the charge stock in the pretreating zone and which are now contaminated with metallic constituents, are discarded. All or part of the remaining portion of separated catalyst fine particles, of a size larger than the discarded fines, are pulverized in order to produce a new supply of catalyst fines for use in the pretreating or demetalizing stage of the process. All or part of that portion of the coarser catalyst which is normally discarded and replaced by fresh catalyst in order to maintain equilibrium activity may also be ground as an additional source of catalyst fines for use in the demetalizing stage. The particles are ground sufficiently small that they will be discarded as the finest portion after another pass through the system.

The grinding step is not only essential to the process from the standpoint of providing a new supply of catalyst fines for the demetalizing but is also important in that it creates new surfaces in the catalyst particles, thereby increasing the capacity of the fines for adsorption in the demetalizing operation. Further, the grinding operation enables the continuous discarding of contaminated particles.

The pulverized catalyst particles are returned to the pretreating or slurrying stage as needed.

By preferentially adsorbing the metallic constituents described above on the catalyst fines prior to the catalytic conversion, I avoid deposition of these metals on the active catalyst, reduce coke laydown and loss in activity of the catalyst. Consequently, less make-up catalyst can be added to the system in order to maintain the desired equilibrium activity level.

Referring now to Figure 1 in detail, fresh charge is introduced by pump 1, through line 2, into soaking reactor 4, which may be held at a temperature of about 550° F.–650° F. This temperature is desirably just below the temperature at which significant cracking of the charge stock occurs, for although the degree of demetalization increases with increased temperature, the ratio of catalyst to oil is improper for good catalytic cracking. The temperature may be maintained by means of reheated charge and/or by suitable heating means (not shown) in association with soaking reactor 4. Stirring means 6 is provided to agitate the slurry and prevent settling of the fines. Alternatively, the pretreating may be carried out in a coil or tubular chamber.

In this soaking zone catalyst fines of a size between about 0–10 microns are mixed with oil charge. The amount of catalyst fines employed varies depending on the amount of contaminants to be removed but in most cases is in the vicinity of about one-quarter to one pound per barrel of oil charge.

The soaking zone may be equipped with an arrangement for circulating the oil charge-catalyst fines slurry so that the catalyst does not settle out. For example, the slurry is drawn from the bottom of the soaking zone through line 5 and is recycled by means of pump 7 through line 8, back to the top of the soaking zone. Oil-catalyst fines slurry is led through lines 10 and 12 into line 14, at the beginning of which it contacts regenerated catalyst returning from regenerator 70 by means of line 16. Line 9 serves to remove any vapors formed in the pretreating step from soaking zone 4 to line 12, in which it is mixed with oil-catalyst fines mixture which is to be introduced into the reactor.

The oil-catalyst fines mixture plus regenerated catalyst then enters reaction chamber 18, where it is subjected to catalytic cracking conditions. The hydrocarbon products from the catalytic cracking reaction leave the top of the reator by means of line 22. Substantially all of the catalyst fines in the product are returned to the main catalyst bed by means of cyclone separator or separators 21.

The product then enters fractionator 24. The overhead product from the fractionator, which comprises gas and gasoline, passes through condenser 26 into reflux drum 28. The gases are separated from the liquid in the reflux drum and leave by way of line 30 for further purification and storage. Part of the liquid, which is collected in the reflux drum, is utilized as reflux for the column by pumping it through line 29, pump 31 and line 32. Another portion of the liquid overhead product is pumped off by line 34 to storage or for further purification. Liquid recycle oil is drawn off from the fractionating column through line 36. Heavy recycle oil is drawn off from the column through pump 37 and line 38. Bottoms from the column or so-called "decanted oil" is drawn off the column through line 50. Arrangements are made to recycle part of the bottoms by way of line 44 through pump 45, through waste heat boiler 46 and then by way of line 48 back into the fractionating column. The slurry oil which comprises the heavy material from the fractionator along with some catalyst fines which were not removed by the cyclone 21 leave the bottom of the column by way of line 40 and are mixed with heavy recycle oil flowing in line 52. This mixture passes by way of line 54 through pump 55 to line 12, by means of which it is returned to the catalytic cracker 18 for further treatment. Another part of the heavy recycle oil passes by way of lines 42 and 12 back to reactor 18 for further treating.

A stream of catalyst flows from reactor 18 through valve 56 into stripping zone 58 where it is contacted in a counter-current operation with steam entering at line 92, the steam-oil mixture from this zone passes off through line 20 then through cyclone separator 21 and through line 22 into the fractionator 24. The stripped catalyst is removed through valve 60, where it is picked up in a stream of air, or air plus an inert gas, and transported by means of line 62 into the regenerator 70. Here it is contacted with more air entering regenerator 70 through line 66. Catalyst smaller than 20 microns in diameter and some larger particles are allowed to pass overhead from the regenerator 70 to a collection system 74 directly above the regenerator. Catalyst particles of size greater than about 20 microns are returned to the main body of catalyst in regenerator 70 by means of cyclone separator or separators 72. All of the catalyst of a size between about 10 to 20 microns is retained in the collection system 74 by means of cyclone separator 76 or other sutiable separation means, which allows the finer sized catalyst (of size between about 0 to 10 microns) to pass through and be discarded. All or part of the catalyst between about 10 to 20 microns passes through line 80 into storage hopper 82, where it is conveyed as needed by means of line 84 to pulverizer 86. When less than all of it is led to storage hopper 82, the remainder may be mixed by means not shown with coarser catalyst particles returning from the regenerator 70 through line 16 to contact oil to be cracked. In the pulverizer catalyst between about 10 to 20 microns is reduced to a size between about 0 and 10 microns and then passes as needed by means of line 88 into soaking chamber 4 where the fines become contaminated with ash forming metallic constituents by contacting fresh oil charge. On the next pass through the system these catalyst fines produced by grinding will be discarded through cyclone separator 76 and line 78. The only catalyst fines fraction which is pulverized and introduced into the soaking chamber is that containing particles in the size range between about 10–20 microns. Catalyst particles of this size are produced by attrition in the reactor or regenerator or are contained in the make-up catalyst supplied to the regenerator through line 68. Advantageously, the make-up catalyst is previously sized to contain no material of a size between about 0 to 10 microns.

In most instances enough catalyst fines of a size between 10 to 20 microns will be present through attrition and catalyst make-up addition to provide sufficient pulverized catalyst fines for adequate demetalizing operations, that is, in the range of about one-quarter to one pound of catalyst fines per barrel of charge. In the event this is not true, the coarser catalyst which is replaced by fresh catalyst in order to maintain equilibrium activity may be ground to augment the supply of about 0–10 micron size pulverized fines produced by grinding the 10–20 micron size catalyst fines available. It should be understood, however, that a substantially smaller or larger proportion of catalyst fines to charge stock than that mentioned above may be employed with beneficial results.

A preferred mode of operation is that where the amount of pulverized catalyst fines added to the soaking chamber corresponds to the use of a selected amount of catalyst particles of a size between 10 to 20 microns available from the regenerator plus the amount of coarser catalyst normally discarded to maintain equilibrium activity. In this modification the rate of addition of make-up catalyst to the system is adjusted to maintain the preselected desired equilibrium catalyst activity, and the majority of catalyst is eliminated from the system as contaminated fines. Whatever separated catalyst particles remain, after discarding the contaminated fines, these are pulverized with the coarser catalyst normally discarded and returned to the soaking zone. This amount of fresh fines may be sufficient to remove substantially all of the contaminants in the charge stock, i. e., in the amount of about one pound of fines per barrel of charge; it may be less than this amount, or in some cases it may be more than this amount. Whatever amount of fresh catalyst fines of size about 10-20 microns is provided by the system, this amount is ground and returned to the soaking step. This mode of operation is preferred because of its simplicity and improved results, i. e., less make-up catalyst is required and there is no necessity for constantly measuring amounts of catalyst fines and coarse catalyst normally discarded in order to produce a particular catalyst fine:oil ratio in the soaking reactor.

It is possible to obtain advantages, however, when only part of the 10-20 micron size particles available and/or the coarser catalyst normally discarded is ground and used in the pretreating step, despite the fact that more complete demetalization may not occur when the ratio of fines to charge stock is very low. In all cases the amount of catalyst make-up necessary to produce equilibrium activity will be less than when no pretreating step is employed. This is true, since even where only a small proportion of contaminants are removed in the pretreating step, deactivation of the catalyst due to these contaminants will be reduced to some degree. Consequently as long as the pretreating is carried out in some degree, a lower rate of addition of make-up catalyst is permissible while still maintaining the preselected equilibrium catalyst activity.

Although it is considered advantageous to operate in the manner described above, in instances where substantially complete demetalization is desired, and where insufficient catalyst particles of size between 10 to 20 microns plus coarse catalyst normally discarded to maintain equilibrium activity can be derived from the system, make-up fines may be added in the desired amount to produce the optimum ratio of fines to charge stock through line 90. Advantageously, the make-up fines of a size between 0 to 10 microns may be those removed from the make-up catalyst by sizing it to contain no 0-10 micron size material as previously described. Alternatively, various adsorbent clays and like materials of a size between 0 to 10 microns may be employed as make-up fines. The latter operation is considerably less desirable in view of the fact that an extraneous material is introduced into the fluid cracking system. This is to be avoided in view of the possibility of harmfully affecting the product and/or cracking catalyst.

It is understood of course that cyclone separators and their various equivalents are not perfectly efficient. Therefore, when discussing catalyst particles of certain size range it will be recognized that I intend the portion of solids having mainly the size range mentioned. Moreover, it is to be noted that these sizes are pseudo-diameters. The particles in question are of irregular and varied shapes. When such particles are analyzed for size range by sedimentation methods, the settling rates of the particles are compared with settling rates of spherical particles. A particle which settles at a rate equivalent to that of a spherical particle of 10 microns diameter is then called a 10 micron diameter particle.

The size range of particles discarded and that of the fine particles which are ground may be somewhat broader or somewhat narrower than mentioned above without interfering with the operability of the process. The size ranges mentioned are preferred in most instances, however, for economic reasons.

The reaction conditions employed in the reactor or regenerator, i. e., temperature, pressure, catalyst:oil ratio, and the like form no part of my invention and are those normally employed in fluid catalytic cracking. Since these conditions are familiar to those skilled in the art, it is not considered necessary to list them in detail. Similarly, the catalyst particle size is that normally employed in a fluid catalytic process, between about 50-400 mesh, with the make-up catalyst of this invention preferably sized to contain no material of a size below 10 microns. I contemplate those catalysts known to the art as useful in fluid catalytic cracking. Merely by way of example, some satisfactory catalysts are silica-alumina composites or mixtures, various synthetic gels, Filtrol, various acid treated clays, activated earths, and the like. Charge stocks employed may be any normally charged to a fluid cracking unit.

The temperature in the soaking reactor is desirably between about 300° and about 650° F., althouugh lower or higher temperatures may be employed. Temperatures in the upper part of the range are most advantageous, since they produce more complete demetalization. Generally speaking, temperatres substantially above about 650° F. are to be avoided, since cracking begins to occur at about this temperature. As previously discussed the pretreatment in the soaking reactor is carried out for an appreciable length of time in order to remove most of the metals prior to treatment with the main body of catalyst. Advantageously, the pretreatment is controlled so as to produce an average contact time between the charge and the catalyst fines of about 10 to 60 minutes.

One advantage of my process is that I am able to provide the desired equilibrium activity level of the catalyst with minimum addition of catalyst make-up. An additional advantage of my process is that I am able to effect more efficient demetalization of a charge to a fluid unit than was heretofore possible. Further, I have been able to accomplish these advantages with minimum additional expense with regard to extraneous treating equipment and materials. This is true of the latter, since the source of my metallic adsorbent is integral with the system.

What I claim is:

1. A process for removing an inorganic contaminant from a hydrocarbon oil charged to a fluid catalytic cracking unit comprising pretreating said hydrocarbon oil by admixture thereof with a minor proportion of catalyst particles consisting essentially of cracking catalyst fines that are sbstantially uncontaminated with said contaminant and which are of a size sufficiently small that they will be discarded after a single passage through the fluid catalytic cracking unit, and contacting all of said oil and all of said catalyst fines without cracking of the oil at a temperature of at least 300° F. but below the incipient cracking temperature for said oil, for an average contact period of from about 10 to about 60 minutes, until a major portion of the contaminant adsorbable on said catalyst fines has been adsorbed thereon, and after adsorption of said contaminant on said fines but before any appreciable cracking of any portion of the oil has occurred, contacting the decontaminated oil-contaminated catalyst fines mixture with a main body of cracking catalyst particles that are of larger size than said catalyst fines and that are substantially uncontaminated with said contaminant, in a cracking zone, at cracking conditions, and cracking said hydrocarbon oil while in contact with said fluidized cracking catalyst, withdrawing cracked porduct, removing catalyst and contaminated fines from the cracking zone to a regenerating zone, regenerating catalyst and returning regenerated catalyst to the cracking zone, separting catalyst particles of a size smaller than those of the main body of catalyst, including the contaminated catalyst fines, from the main body of catalyst, separating these catalyst particles into a finer portion containing substantially all of the contaminated fines separated from the main body of catalyst, and a coarser portion consisting essentially of particles that are substantially uncontaminated with said contaminant, discarding all of said finer portion, pulverizing the coarser uncontaminated portion to the size of the discarded portion so that the particles so pulverized will be discarded upon their next passage through the fluid catalytic cracking unit, and pretreating fresh, contaminated hydrocarbon oil by contacting it with these pulverized, uncontaminated particles to remove inorganic contaminant as described above.

2. The process of claim 1 where the proportion of catalyst fines to hydrocarbon oil is between about 0.25 and about 1.0 pounds per barrel.

3. The process of claim 1 wherein the catalyst fines originally admixed with the contaminated hydrocarbon oil are of a size between about 0 and 10 microns, wherein the catalyst particles that are of a size smaller than those of the main body of catalyst and that are separated from the main body of catalyst are of a size between about 0 and 20 microns, where the discarded finer portion, containing substantially all of the contaminated fines separated from the main body of catalyst, contains particles of a size of between about 0 to 10 microns, and where said coarser portion, consisting essentially of particles that are substantially uncontaminated with said contaminant, contains particles of a size between about 10 and 20 microns, and where the particles of said coarser portion are pulverized to a size between about 0 and 10 microns.

4. The process of claim 1 where there is also withdrawn a portion of the main body of catalyst that contains particles substantially uncontaminated with said contaminant, and where this portion is replaced with fresh, make-up catalyst to maintain a preselected activity level for the main body of cracking catalyst, and where the portion of uncontaminated catalyst so withdrawn is pulverized, together with the coarser uncontaminated portion of separated particles, to the size of the discarded particles, and where the fresh, contaminated hydrocarbon oil is pretreated with these pulverized particles to remove inorganic contaminant.

5. A process for maintaining a preselected cracking catalyst activity level during the fluidized catalytic cracking of a hydrocarbon oil feed that contains an inorganic contaminant, while at the same time reducing the proportion of cracking catalyst withdrawn and replaced with fresh, make-up catalyst to maintain said preselected activity level, comprising pretreating said hydrocarbon oil by admixture thereof with a minor proportion of catalyst particles consisting essentially of cracking catalyst fines that are substantially uncontaminated with said contaminant and which are of a size sufficiently small that they will be discarded after a single passage through the fluidized catalytic cracking system, and contacting all of said oil and all of said catalyst fines without cracking of the oil at a temperature of at least 300° F. but below the incipient cracking temperature for said oil, for an average contact period of from about 10 to about 60 minutes, until a major portion of the contaminant adsorbable on said catalyst fines has been adsorbed thereon, and after adsorption of said contaminant on said fines but before any appreciable cracking of any portion of the oil has occurred, contacting the decontaminated oil-contaminated catalyst fines mixture with a main body of fluidized cracking catalyst particles that are of larger size than said catalyst fines and that are substantially uncontaminated with said contaminant, in a cracking zone, at cracking conditions, and cracking said hydrocarbon oil while in contact with said fluidized cracking catalyst, withdrawing cracked product, removing catalyst and contaminated fines from the cracking zone to a regenerating zone, regenerating catalyst and returning regenerated catalyst to the cracking zone, separating catalyst particles of a size smaller than those of the main body of catalyst, including the contaminated catalyst fines, from the main body of catalyst, separating these catalyst particles into a finer portion containing substantially all of the contaminated fines separated from the main body of catalyst, and a coarser portion consisting essentially of particles that are substantially uncontaminated with said contaminant, discarding all of said finer portion, pulverizing the coarser, uncontaminated portion to the size of the discarded portion so that the particles so pulverized will be discarded upon their next passage through the fluidized catalytic cracking system, and pretreating fresh, contaminated hydrocarbon oil by contacting it with these pulverized, uncontaminated particles to remove inorganic contaminant as described above, and continuing the process, and during the process, withdrawing a portion of the main body of catalyst and replacing it with fresh, make-up catalyst to maintain the preselected activity level of the catalyst, the amount of catalyst removed and replaced being less than that required to maintain the same activity level in the absence of said pretreating.

References Cited in the file of this patent

UNITED STATES PATENTS

| Number | Name | Date |
|---|---|---|
| 2,355,016 | Stein | Aug. 1, 1944 |
| 2,378,531 | Becker | June 19, 1945 |
| 2,382,755 | Tyson | Aug. 14, 1945 |
| 2,421,212 | Medlin | May 27, 1947 |